Oct. 17, 1967  F. A. G. TIMMERMANS ET AL  3,348,142
DEVICE FOR MEASURING TWO CONSECUTIVE MAGNITUDES
AS ELECTRICAL SIGNALS
Filed Feb. 27, 1963  2 Sheets-Sheet 1

INVENTORS
F. A. G. Timmermans
A. Snel

Watson, Cole, Grindle + Watson
Attys.

Oct. 17, 1967  F. A. G. TIMMERMANS ET AL  3,348,142
DEVICE FOR MEASURING TWO CONSECUTIVE MAGNITUDES
AS ELECTRICAL SIGNALS
Filed Feb. 27, 1963  2 Sheets-Sheet 2

INVENTORS
F. A. G. Timmermans
A. Snel
Watson, Cole, Grindle + Watson
Attys.

United States Patent Office 3,348,142
Patented Oct. 17, 1967

3,348,142
DEVICE FOR MEASURING TWO CONSECUTIVE MAGNITUDES AS ELECTRICAL SIGNALS
Frederik Arend Gerhardus Timmermans, Rotterdam, and Albert Snel, Delfgauw, Netherlands, assignors to Nederlandse Organisatie voor Toegepast-Natuur-Wetenschappelijk Onderzoek ten Behoeve van Nijverheid, Handel en Verkeer, The Hague, Netherlands, a corporation of the Netherlands
Filed Feb. 27, 1963, Ser. No. 261,536
Claims priority, application Netherlands, Mar. 2, 1962, 275,501
2 Claims. (Cl. 324—99)

The invention relates to a device for measuring two consecutive magnitudes which are supplied in the form of electrical signals, provided with a balancing potentiometer which is connected in parallel to a reference voltage source and which has a sliding contact having its zero position on the potentiometer, the sliding contact being connected with a driving mechanism, which can be controlled by the signal, and provided with a second sliding contact, which is situated either on the balancing potentiometer or on an extra balancing potentiometer connected in parallel with the first balancing potentiometer.

Such a device is known from U.S. patent specification 2,612,628.

With this known device it is impossible to carry out an automatic averaging of magnitudes which are supplied pairwise.

For this reason, the magnitudes are in practice measured one after the other and averaging is effected by means of a simple arithmetical action.

Yet, although the action is simple, it may, where long measuring series are concerned, prove a laborious and time-consuming job. The object of the invention is to provide a device which is able to average signals pairwise and automatically.

For this purpose, the invention is characterized in that a coupling between the sliding contacts and a zero position throw-over switch are provided, in such a way that in the coupled condition the 2nd magnitude is measured between the contacts, and the 2nd sliding contact moves away from a fixed starting position, both contacts then travelling along equal but opposite voltages on the potentiometer(s).

With the aid of the device according to the invention it is possible at once to determine the average of two magnitudes in two successive measurements.

The order of succession of these magnitudes is not important, provided that care is taken that the measuring of the first magnitude of the pair of magnitudes to be averaged is effected between the zero position and the first sliding contact, the second sliding contact then being disconnected, and that the measuring of the second magnitude is effected between the two sliding contacts, the second sliding contact then being connected. The first measurement always is a conventional measurement.

When both measurements have been effected, the displacement of the first sliding contact relative to its zero position indicates the average of the two magnitudes.

An embodiment of the device according to the invention, in which the signals are supplied via a switch and which is particularly suitable for measuring the terminal voltage of a measuring circuit having a direct voltage source, is characterized in that the switch is a reversing switch, which changes the polarity of the signal and of the direct voltage source when the second sliding contact is coupled or uncoupled respectively.

A device according to this embodiment of the invention is particularly important for the automatic elimination of thermoelectric voltages from the measuring circuit, which are apt to occur as nuisances when measuring on a strain gage measuring bridge with direct voltage supply.

The invention will be further illustrated with reference to the five figures of the annexed drawing.

In these figures like references numerals refer to like elements.

Figure 1:
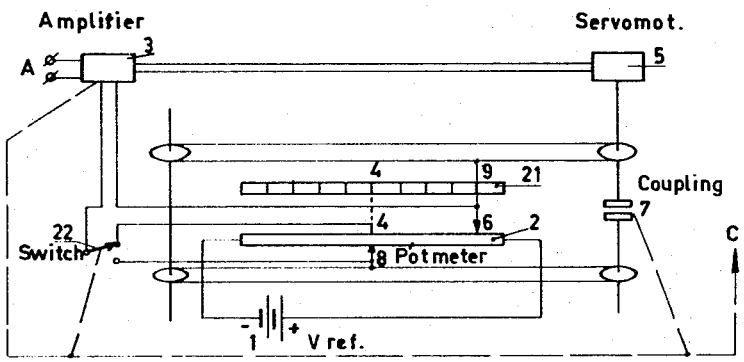
FIG. 1 shows an embodiment of the device according to the invention having one balancing potentiometer and the first sliding contact in the position after the first measurement.

In FIG. 1 the balancing potentiometer 2 is connected to the reference voltage source 1. The balancing potentiometer 2 is provided with a fixed tapping or a zero position 4. The magnitude to be measured is supplied to the device at A.

The device is generally provided with an amplifier 3, which amplifies the magnitude.

The output of the amplifier 3 is connected to a servomotor 5. A pulley 25 is keyed to the shaft 29 issuing from the servomotor 5. A pulley 26 is keyed to the shaft 30. A clutch 7 forms a coupling which can interconnect the shafts 29 and 30.

About the shaft 31 there are free rotating pulleys 27 and 28. If the motor 5 has been excited and the clutch 7 is in disengagement only the pulley 25 is driven by the motor 5. The pulley 25 in its turn drives the endless rope 32 and with this the pulley 27, which rotates freely about the shaft 31.

When, however, the clutch 7 is in engagement, the motor 5 drives both the pulleys 25 and 26. The pulley 25 again drives the rope 32 and the pulley 27 drives the rope 34. The contacts 6 and 8 are connected to different parts (sides) of the ropes 32 and 34. Therefore, if the contact 6 is connected on the engaging side of the rope 32, then the contact 8 is connected on the delivery side of the rope 34, and vice versa.

When the clutch 7 is in engagement, the contact 6 and 8 move in opposite directions when the motor 5 is excited. A magnitude on the input A of the amplifier 3 can now shift the sliding contact 6 or the sliding contacts 6 and 8 on the balancing potentiometer 2.

When the clutch 7 is in disengagement, the said magnitude causes a shift of the contact 6 only, and when the voltage between the fixed tapping 4 and the sliding contact 6, guided back by the switch 22 in the condition I to the amplifier 3, is equal to the said magnitude, the servomotor stops. The magnitude which is then measured is the first of the two magnitudes. When the clutch 7 is in engagement, the magnitude which is then measured causes a shift of both sliding contacts 6 and 8, and when the voltage between the said contacts 6 and 8, guided back by switch 22 in the condition II to the amplifier 3, is equal to the said magnitude, the servomotor 5 also stops. The magnitude measured this time was the second of the two magnitudes.

Figure 2:
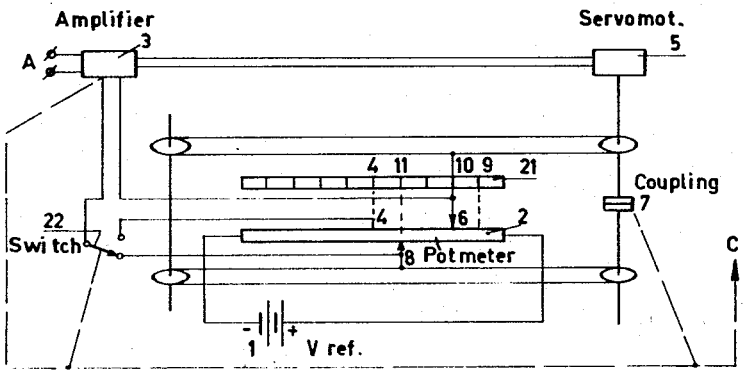
FIG. 2 shows the device according to FIGURE 1 in its final position.
Figure 4:
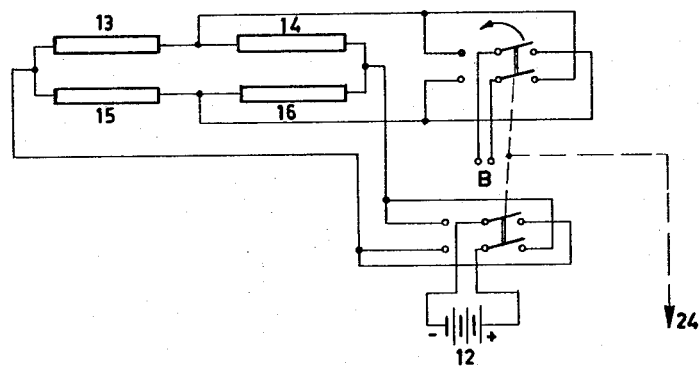
FIG. 4 shows the measuring bridge of FIG. 3, the terminal voltage and the direct voltage source being reversed.

The operation of the clutch 7 and the switch 22 after the measurement of a magnitude, can be effected manually, but in the present embodiment of the invention it is effected automatically with the aid of a printing wheel and channel switching system incorporated in a "Brown Self-balancing Potentiometer," in which the amplifier 3 is also included. A dash-line in FIGS. 1, 2 and 5 indicates the interconnection (coupling) between the clutch 7, the switch 22 and the amplifier 3. In FIG. 4, the switch 24 also forms part of this interconnection. Now let it be assumed that after the measurement of the first magnitude the sliding contact 6 indicates the position 9 on the scale 21, then the contacts 6 and 8 will, when the second magnitude is measured, move in opposite directions, until the voltage between the contacts 6 and 8 is equal to the input voltage of the amplifier 3.

The contact 6 has then shifted into the position 10 and the contact 8 into the position 11, and the voltage between the positions 10 and 9 is equal to the voltage between the positions 11 and 4, whilst the voltage between the zero postion 4 and the sliding contact 6 represents the average value of the two magnitudes measured.

In reality the operation of the device comes down to the division in two of the differences between the two magnitudes to be measured. The known strain gage measuring bridge of FIG. 3 is built up from the strain gages 13, 14, 15 and 16 and a direct voltage source 12.

The output voltage of the bridge is drawn off at the terminals at B.

There can occur variations of potential in the bridge, which can result in thermoelectric voltages having an adverse influence on the measuring result.

Figure 3:
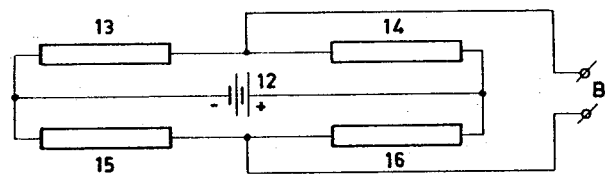
FIG. 3 shows a known strain gage measuring bridge.

Let it be assumed that the output voltage of the bridge according to FIG. 3 is $E+et$, then the output voltage of that same bridge, after the reversal of its bridge supply and its terminals, is $E-et$. Now if these two voltages $(E+et)$ and $(E-et)$ are averaged by means of the device according to the invention, the thermoelectric voltage $et$ has been eliminated. In FIG. 4 is represented a bridge provided with a reversion switch 24.

Figure 5:
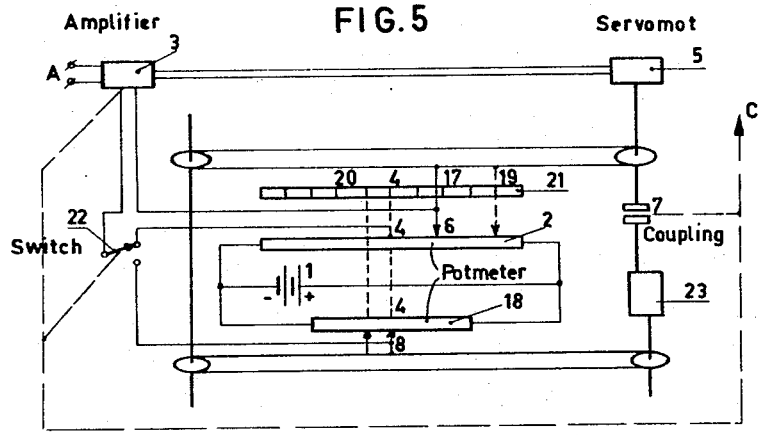
FIG. 5 shows an embodiment of the device according to the invention having two balancing potentiometers.

In FIG. 5 is shown a device according to the invention having two balancing potentiometers 2 and 18. Let us assume that $E-et$ is measured first and that the contact 6 indicates the position 17 on the scale. Let us assume that subsequently $E+et$ is measured, the coupling then being connected; then the contact 6 shifts into the position 19 and the second contact into 20. The voltage E then appears between the zero position 4 and the position 19.

All of the preceding figures have been based on an equality of the displacements of the contacts 6 and 8. This is, however, not strictly necessary.

It is essential that the contacts 6 and 8 should travel over equal voltages. By an apt choice of transmission ratio with the aid of the retarding box 23 between the motor 5 and the contact 8, two different balancing potentiometers 2 and 18 could be applied in the embodiment of FIG. 6.

It is clear that the notion of a balancing potentiometer also covers a resistance box having tappings and provided with a step by step switch for these tappings, this switch being substituted for the sliding contact mentioned hereinbefore.

We claim:

1. Apparatus for measuring the average of two signals comprising, a potentiometer supplied by reference voltage, a zero position tap on the potentiometer, a first movable contact on the potentiometer, a second movable contact on the potentiometer normally set at the zero point of the potentiometer, first servo-rebalance means for positioning the first contact in relation to the zero position tap until the potential drop between the first contact and zero position tap has a pre-determined relation to a first signal, means including the first servo-rebalance means for driving the first and second contacts in equal but opposite directions until the potential drop across the first and second contacts has a pre-determined relation to a second signal, whereby the position of the first contact represents the average of the first and second signals.

2. Apparatus according to claim 1, wherein the potentiometer consists of two resistance strips connected in parallel and has the zero position tap and the first movable contact on one strip and the second movable contact on the other strip.

References Cited

UNITED STATES PATENTS 3,138,748   6/1964   Scott et al. _____ 318—28

RUDOLPH V. ROLINEC, *Primary Examiner.*

W. CARLSON, *Examiner.*

G. LETT, E. KARLSEN, *Assistant Examiners.*